United States Patent

Bains

[11] Patent Number: 6,133,546
[45] Date of Patent: Oct. 17, 2000

[54] PROCESS AND DEVICE FOR HEATING WINDSCREEN WASHER LIQUID

[75] Inventor: Rashpal Bains, Buchwiesenstrasse 2, CH-8586 Erlen, Switzerland

[73] Assignees: Mannesmann VDO AG, Frankfurt, Germany; Rashpal Bains, Erlen, Switzerland

[21] Appl. No.: 09/147,222
[22] PCT Filed: Jun. 4, 1997
[86] PCT No.: PCT/EP97/02902
§ 371 Date: Apr. 12, 1999
§ 102(e) Date: Apr. 12, 1999
[87] PCT Pub. No.: WO97/46431
PCT Pub. Date: Dec. 11, 1997

[30] Foreign Application Priority Data

Jun. 4, 1996 [CH] Switzerland ............... 1399/96

[51] Int. Cl.[7] ............................................. B60L 1/02
[52] U.S. Cl. ..................... 219/202; 219/203; 239/130; 239/133; 239/284.1; 318/102
[58] Field of Search .................... 219/202, 203; 239/284.1, 133, 130; 318/102; 15/250.01, 250.02, 250.03, 250.04, 250.05, 103; 392/471, 473, 485, 488, 489

[56] References Cited

U.S. PATENT DOCUMENTS

| 3,574,881 | 4/1971 | Temple | 15/250.04 |
|---|---|---|---|
| 3,657,618 | 4/1972 | Ori et al. | 318/102 |
| 4,090,668 | 5/1978 | Kochenour | 239/130 |
| 4,212,425 | 7/1980 | Schlick | 239/133 |
| 4,821,363 | 4/1989 | Delluc | 15/250.05 |
| 5,012,977 | 5/1991 | Kaklins et al. | 239/284.1 |
| 5,062,175 | 11/1991 | Buchanan et al. | 15/103 |
| 5,065,471 | 11/1991 | Laplante | 15/250.04 |
| 5,354,965 | 10/1994 | Lee | 219/202 |
| 5,509,606 | 4/1996 | Breithaupt et al. | 239/130 |
| 5,632,058 | 5/1997 | Stanak | 15/250.04 |
| 5,927,608 | 7/1999 | Scorsiroli | 239/284.1 |
| 5,957,384 | 9/1999 | Lansinger | 239/284.1 |

FOREIGN PATENT DOCUMENTS 2419849 10/1979 France .
0149292 6/1996 Switzerland .

OTHER PUBLICATIONS

Patent Abstracts of Japan vol. 014, No. 221, May 10, 1990 & JP 02 053656 A (Fumio Fujihara: Others: 01) Feb. 22, 1990.
Patent Abstracts of Japan vol. 008, No. 096 (M–294) May 4, 1984 & JP 59 011949 A (Isamu Uchida), Jan. 21, 1984.

Primary Examiner—Teresa Walberg
Assistant Examiner—Leonid Fastovsky
Attorney, Agent, or Firm—Martin A. Farber

[57] ABSTRACT

Only a small useful quantity of washing water as close as possible to the spray nozzles of the windshield wiper system is heated. As a result of corresponding miniaturization, the heating time can be reduced to 5 to 10 seconds. A sufficient cleaning effect can be achieved in most cases by hot water after the windshield spray system is actuated two or three times. Additional cleaning can be carried out either by rinsing with colder or cold water or by repeating after 10 to 20 seconds. The water is heated via an instant heating element which, with a content of, for example, 10 to 50 $cm^3$, can be installed even in a secondary chamber. Some of the heat energy is therefore stored in a larger thermal reserve tank of, for example, 1 dl.

10 Claims, 4 Drawing Sheets

PROCESS AND DEVICE FOR HEATING WINDSCREEN WASHER LIQUID

FIELD AND BACKGROUND OF THE INVENTION

The invention relates to a method for heating the washing fluid for the windshield wiper system of vehicles and to a corresponding thermal windshield washer system.

It is an experimental fact that the effectiveness of a washing fluid is appreciably greater if the water is warm or even hot. This is also true of windshield washer systems of vehicles. An additional fact in the case of vehicles is that a thin ice layer forms on the windshield in the colder season. Where internal combustion engines are concerned, a great amount of excess heat is generated during operation, and this can be used, at least in winter, for heating the vehicle interior and for heating the washing fluid. Since the vehicle interior often does not require heating, however, separate line systems must be provided for both functions. Heating the washing water via the engine heat presupposes the internal combustion engine has been in operation for some time. During the cold starting of a vehicle, therefore, there is no heated washing water available, above all in the cold season. In order to device the vehicle windshield, the engine in each case has to be run in the idling mode for some time, until the washing water has reached a sufficient temperature. This results in air pollution.

It was proposed, in Swiss Patent, number 01 492/92-7, to improve this situation by providing to a washing system an additional thermal vessel, in which already heated washing water can be stored. It was assumed that, during travel, heating energy, in particular electric energy, is available in excess, so that it can be stored in a thermal vessel. The thermal vessel can be insulated relative to the outside in such a way that it remains warm, even overnight, so that a frozen windshield can be de-iced in the morning or at any time during the day while parked. It was possible for the functioning capacity of the thermal vessel to be proved by testing over a relatively long period of time. A disadvantage of this thermal vessel is its size, which means that the corresponding storage volume can be installed only on larger types of vehicle. The inventor, then, recognized, however, that all the solutions of the prior art took into account only some of the windshield washing problems. The winter problems were dealt with primarily. In the transitional period, but particularly when the roads are wet, not only dust from the road settles on the windshield, but regularly also a salty and/or oily coating. On dry summer days, there are dead midges which cannot easily be removed due to the protein. When the windshield wiper system is switched on, the entire windshield is often smeared, even though the washing water contains a chemical washing agent.

SUMMARY OF THE INVENTION

The object of the invention, then, is to make it possible to solve the windshield washing problem for all seasons more effectively, in particular also for all types of vehicle.

According to the invention a useful quantity of the washing water is extracted from a reserve tank and heated as a small quantity and is supplied to the windshield wiper system.

The thermal wiper system according to the invention is defined in that it has an instant heating chamber with controllable electric heating as well as a reserve tank and a pump for the conveyance, in particular positive displacement conveyance, of the washing fluid in the instant heating chamber.

It was shown that by far the greatest number of windshield wiping problems do not involve the need for buckets of washing fluid. Instead, only a required useful quantity of washing fluid has to be warm or hot, so that the dirt particles dissolve in the soapy water or chemical washing agent additive. This means, however, that it is normally sufficient if warm or hot washing water is sprayed onto the windshield once or a few times, so that the dirt, salt, oil and protein constituents are transferred into the washing fluid. The remaining cleaning, if this is still necessary, may be carried out just as well with colder or merely lukewarm water. It may be concluded from this, however, that far less than one deciliter, usually only a few cubic centimeters, that is to say only small quantities, are required for only a few spray actuations. It is precisely here where the new invention comes into play. According to the invention, only small quantities are heated, an enormous advantage of this being that small quantities of a few cm$^3$, for example 5 to 20 cm$^3$, can be heated within 5 to 10 seconds. Sufficiently warm water can therefore be made available for a first cleaning of the windshield within the period of time from getting into the vehicle to driving off. If the windshield has to be cleaned during travel, a useful quantity of, for example, 5 to 100 cm$^3$ of hot or warm water is available. Windshield washing, then, may be carried out at intervals. A first cleaning takes place, irrespective of the season, with hot or warm water. If the dirt has components which are really difficult to eliminate, hot washing may be followed by rinsing a few times with colder water. If even this is not sufficient, then the cycle may be repeated once or twice, for example after half a minute. The washing water, because it can be heated in seconds, is heated in the same sense as instant heating, since virtually no waiting time is required before use.

The invention makes a large number of highly advantageous embodiments possible. A small quantity is preferably electrically heated in an instant heating duct and, by pumping conveyance out of a washing water reserve tank and a corresponding positive displacement effect in relation to the instant heating duct, the useful quantity, in each case instantaneous, is supplied directly, as one or more sprays, to the windshield wiper system. Advantageously, the electric heating is controlled in such a way that switch-on and/or the switch-on duration and/or the temperature of the small quantity which is to be reached can be selected. The interesting observation was made that different optimum washing water temperatures are required, depending on the coating on the windshield. Contrary to an initial assumption, in winter, above all when there is ice, water at 40 to 60° C., that is to say only well-warmed water, is optimum. If water near 100° C. is used in cold winter weather, the greatest part evaporates before it has exerted its effect on the windshield. By contrast, in hot summer weather, a temperature of 60 to 80° C. or above is advantageous, since the protein from the midges which have struck the windshield and burst open can be eliminated more effectively. A selector switch for, for example, 50, 70, 90° C. is therefore highly expedient. The new invention makes it possible to adapt the particular solution to the prevailing climatic conditions. If the formation of ice is not an actual problem, as in southern countries, the solution described above is sufficient. If, however, more warm water is required, then it is proposed that the instant heating duct be arranged as a primary chamber within a secondary casing, for the purpose of heat exchange from the instant heating duct into the secondary casing, the latter being thermally insulated relative to the outside. In this solution, the heat generated in the instant heating duct is not simply lost to the surroundings, but is stored in a secondary casing which is insulated relative to the outside. In this case, for the retrofitting of existing vehicles, the instant heating chamber is designed as a primary chamber within a secondary chamber which is connected to a reserve tank, and, in this case, the primary chamber and secondary chamber may be arranged as a structural unit outside or inside the reserve tank. The primary chamber and secondary chamber are designed preferably as a structural unit separate from the reserve tank, a pump for the washing fluid being arranged between the reserve tank and the structural unit, and the structural unit being arranged in proximity to the windshield wiper system. In all cases, however, it is proposed that the instant heating chamber or the structural unit together with the instant heating chamber be thermally insulated relative to the outside.

It is proposed, furthermore, to actuate the switch-on and switch-off of the electric heating via the ignition lock and/or via a switch, the control of the electric heating having separate setting means for selecting the temperature of the washing water.

Primarily, the windshield wiper system of the front windshield of a vehicle is designed according to the invention. However, the rear window may be equipped likewise. The same applies, in principle to the wiper systems for lamp cleaning. The problem is not the same here, however, since heat is generated by the lamp itself and the glass is heated during operation. For lamp cleaning, therefore, there is normally no need for warm water.

Furthermore, in a particularly advantageous combination, in addition to the instant heating of the washing water, in winter the spray nozzles are also heated directly at the outlet, so that they do not ice up and block the outflow of washing water. Since the spray nozzles are small, only a very low additional heating capacity is necessary for this purpose.

BRIEF DESCRIPTION OF THE DRAWINGS

With the above and other objects and advantages in view, the present invention will become more clearly understood in connection with the detailed description of preferred embodiments, when considered with the accompanying drawings of which.

DETAILED DESCRIPTION THE PREFERRED EMBODIMENT

Figure 1:
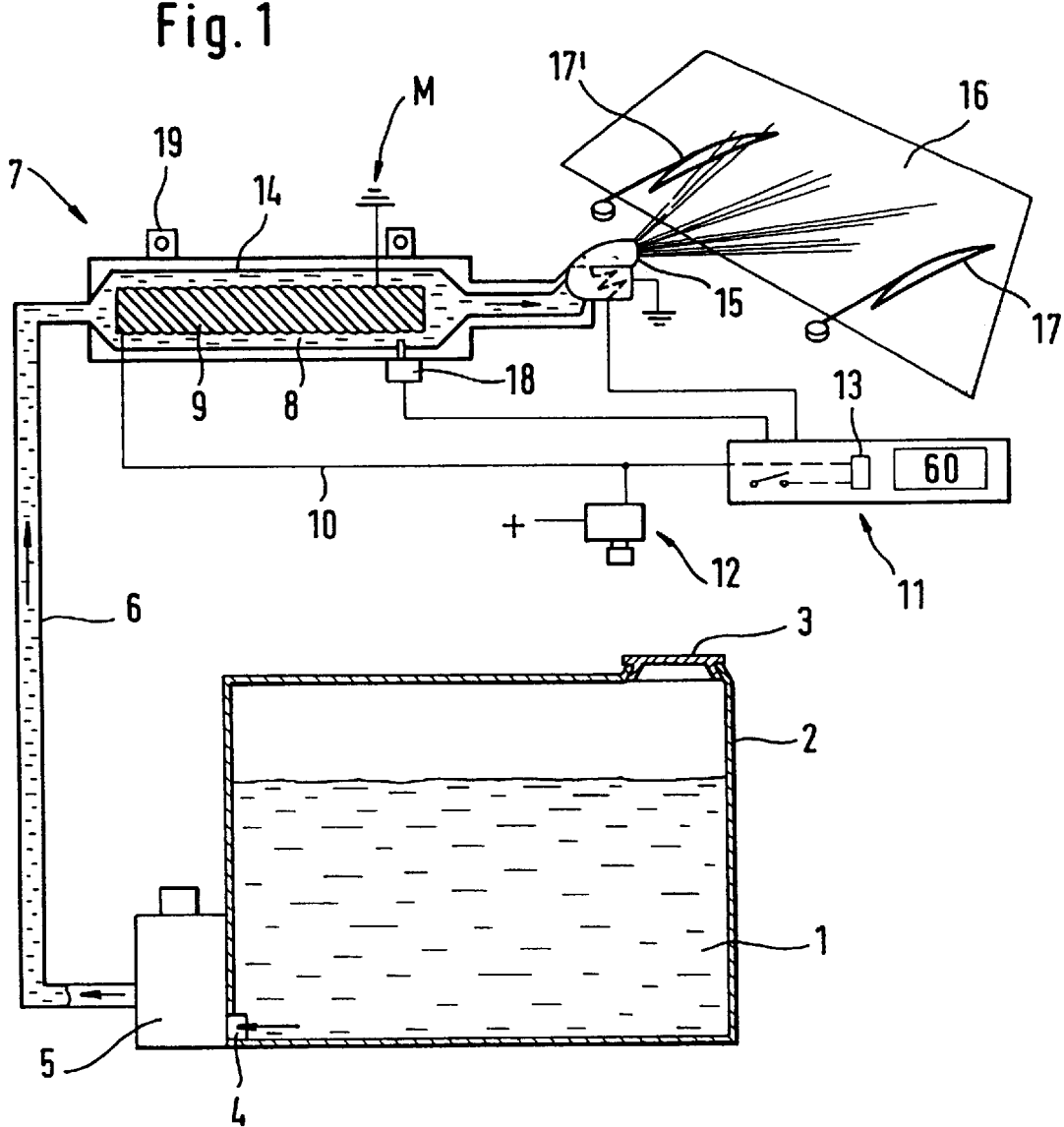
FIG. 1 shows a basic illustration of instant heating for the washing water of a windshield wiper system.
Figure 1A:
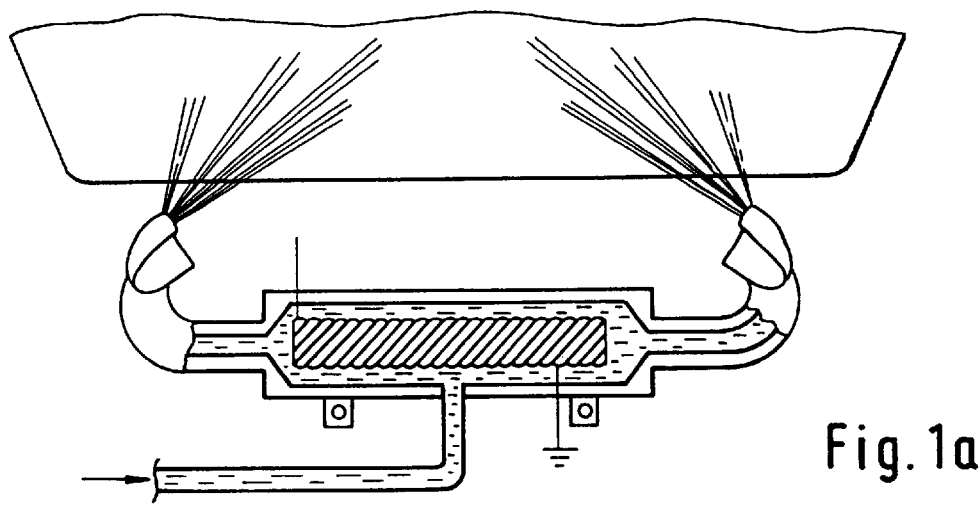
FIG. 1*a* shows a double version of the instant heating.

Reference is made below, then, to FIG. 1 which shows, in simplified form, a windshield wiper system equipped according to the invention. The windshield washing fluid 1 is introduced into a reserve tank 2 having a content of, for example, 2 to 4 liters. The reserve tank 2 has a removable cover 3 for filling purposes. In the region near the bottom, the reserve tank 3 has a suction orifice 4, from which the washing fluid 1 is supplied to an instant heating element 7 via a pressure pump 5 and a connecting line 6. The instant heating element 7 consists essentially of an instant heating chamber 8 with an electric heating element 9 which can be connected to the + pole of the electric power supply of the vehicle. The opposite side of the heating element can be connected to the ground M of the vehicle. The electric heating element 9 is switched on and off via an electric line 10 and an electric control 11. Electric control is, in this case, illustrated merely diagrammatically, with a circuit closer 12 which may be led, for example, via the ignition lock. Furthermore, a circuit closer/breaker 13 is arranged for the electric heating elements 9, so that current is not needlessly converted into heat in a time when warm washing fluid is not required. The numeral 60 merely indicates that a selector switch may be provided in order to set the temperature range. The control may have any expedient design and, for example, also contain time elements, so that, for example, the heating is in each case switched on again at intervals after only a few minutes. The temperature of the washing water is monitored by means of a thermocouple 18, so that the power supply is switched off when the desired temperature is reached. The instant heating element has an outer insulation casing 14, so the heat in the instant heating chamber 8 is not lost to the surroundings too quickly. The instant heating element may be relatively small, for example a diameter of 2 to 4 cm and a length of about 10 to 20 cm are sufficient. The capacity of the instant heating chamber is in the range of, for example, 10 to 50 cubic centimeters. The great advantage of a small unit is that the instant heating element 7 can be led as near as possible to the spray nozzle 15 of the windshield wiper system. With a heating capacity of 70 watts, 5 to 10 cm$^3$ of water are heated to 60 to 80° C. within 5 to 10 seconds. Consequently, after the heating has been switched on, the windshield can be cleaned with warm or hot water once or twice after only 10 seconds. The entire windshield wiper system is illustrated in greatly simplified form with a windshield 16 and with two windshield wipers 17, 17'. Only one spray nozzle 15 is shown, likewise in simplified form, although two spray nozzles are usually provided for a windshield. If two or more spray nozzles 15 are used for the same windshield, they can both be fed from the same instant heating element 7. In this case, it may be advantageous to use a double-acting instant heating element according to FIG. 1*a*. In this case, the water is introduced tangentially in the middle. An outlet for the heated washing water is mounted on each of the two end faces. The instant heating element 7 may be fastened to the vehicle via brackets 19, so that it does not move as a result of the vibrations of the vehicle.

Figure 2:
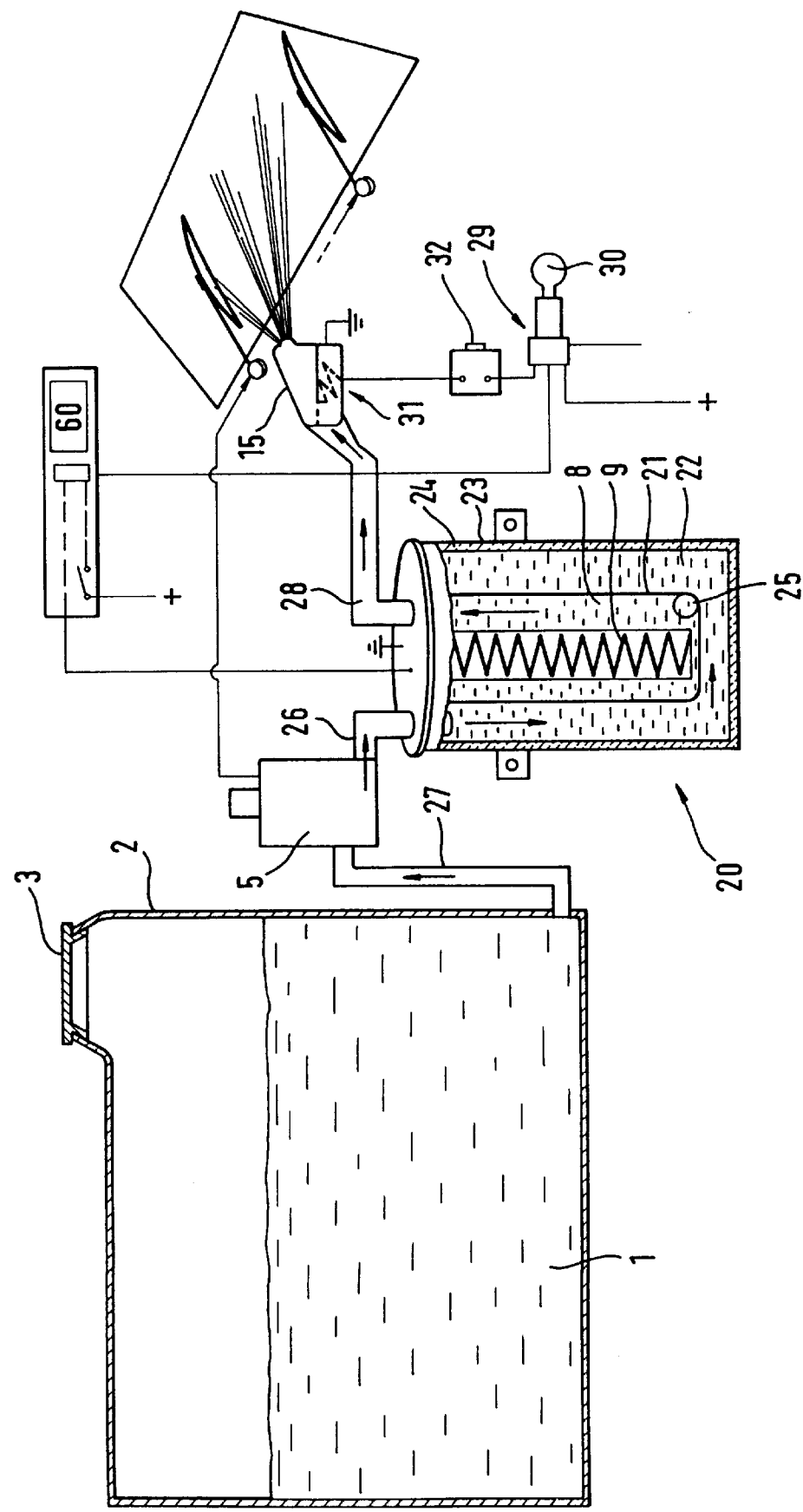
FIG. 2 shows a larger system with a structural unit having a primary and a secondary casing, or thermal store.

FIG. 2 shows a second embodiment of the invention which is designed as a structural unit 20. The structural unit 20 has, from the inside outward, an instant heating element 9, a preferably annular instant heating chamber 8 with a duct wall 21 as well as a secondary heating chamber 22 which has good insulation 24 in the manner of a thermos flask. The insulation should be as good as possible, but, if possible, not brittle. There is a passage 25 for the washing fluid 1 in the lower region of the structural unit between the secondary heating chamber 22 and the instant heating chamber 8. The washing fluid 1 is supplied via an inlet 26 by means of a pump 5. The reserve tank is of any design, as in the prior art, or, in the case of the retrofitting of the existing reserve tank for the washing fluid, is in the vehicle. A hose connection 27 is led from the reserve tank 2 to the pump 5 in cases in which the pump is newly arranged next to the structural unit. If the pump 5 is arranged directly next to the reserve tank 2, the corresponding connecting line is designed as in FIG. 1. An outlet 28 from the instant heating chamber 8 is led directly into the spray nozzle 15. In the solution according to FIG. 2, the washing fluid is heated in the instant heating chamber 8 virtually as quickly as according to FIG. 1. The reason is that, in the case of an electric heating element 9, the transmission of heat into the instant heating chamber 8 takes place very much more quickly than the transmission of heat from the instant heating chamber into the secondary heating chamber 22, this being due to the much greater temperature gradient between the two regions. However, when the windshield washer system is not actuated, the temperatures in the instant heating chamber 8 and in the secondary heating chamber 22 come into line with one another over a period of 10 to 15 minutes. In this way, depending on the design of the electric control, either the heat not required in the instant heating chamber 8 can be stored at a lower temperature in the secondary heating chamber, having a capacity of approximately 1 to 2 dl, or the washing fluid in the secondary heating chamber can also be brought to the desired temperature of use by repeated reheating. If extreme situations where there is a high demand for warm or hot water occur frequently, the solution with a secondary heating chamber or a thermal reserve is advantageous. In FIG. 2, the heating elements 9 are switched on via the ignition lock 29 during switch-on by means of the ignition key 30. In the version illustrated, the spray nozzle 15 may additionally be heated via a corresponding heating element 31, and this may be important if there is a risk of icing. In summer, the heating element 31 may be switched off via a switch.

Figure 3:
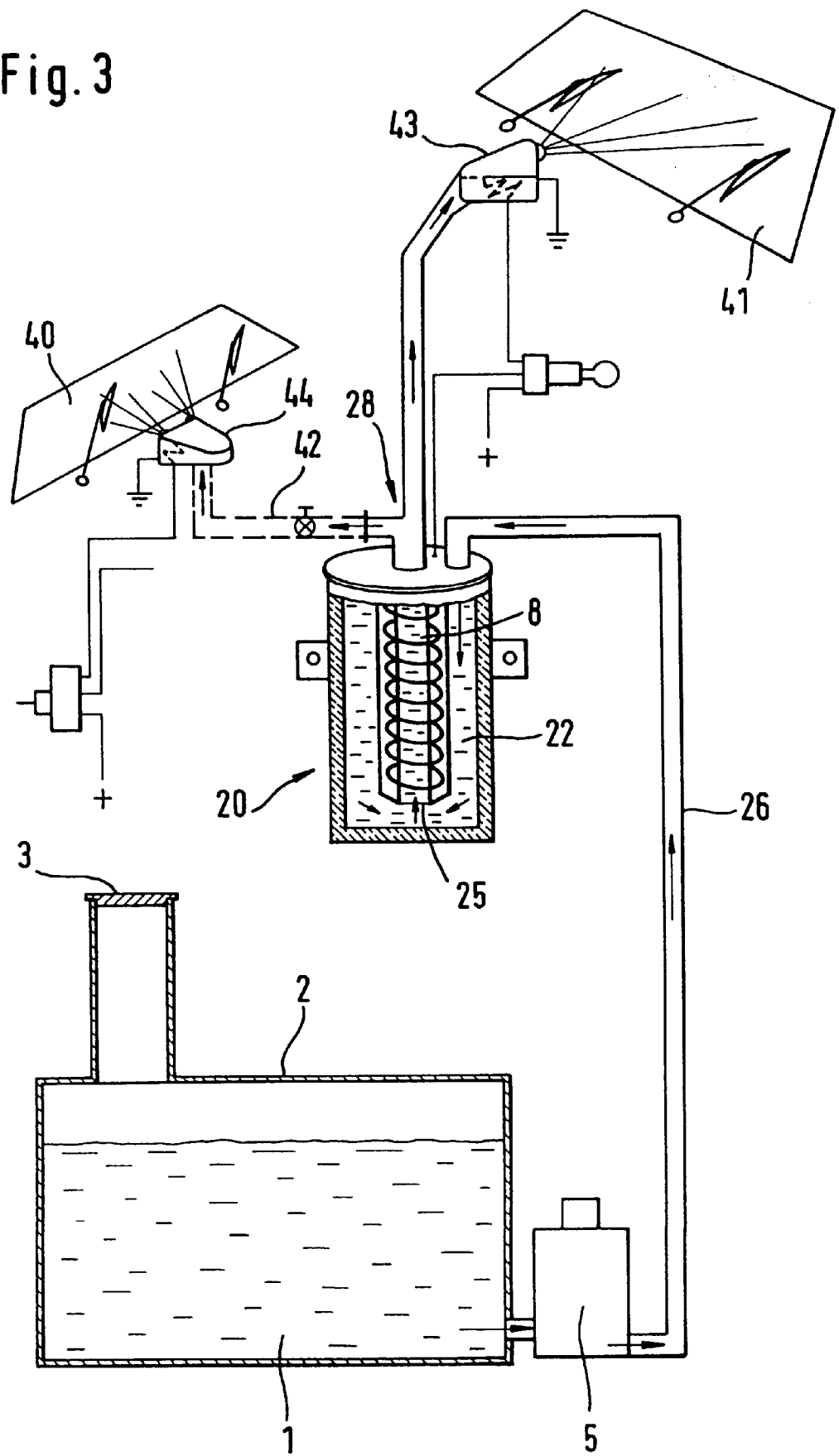
FIG. 3 shows a washer system for the rear window and front windshield.

Reference is made below, then, to FIG. 3. FIG. 3 shows a further embodiment merely diagrammatically. This shows that, in addition to the front windshield washer system 41, the rear window washer system 40 may also be added, according to the invention, in a combined system. It is possible, in this case, that, in the case of the rear window, the washing fluid is not guided via the heating elements. The broken line 42 indicates that the outlet 28 of the structural unit 20 can be connected to the spray nozzle 43 and 42. In the event that the washing water is to be heated both for the front windshield and the rear window, an instant heating element 7 according to FIG. 1 is advantageously arranged at both locations as near as possible to the respective spray nozzles 15.

Figure 4:
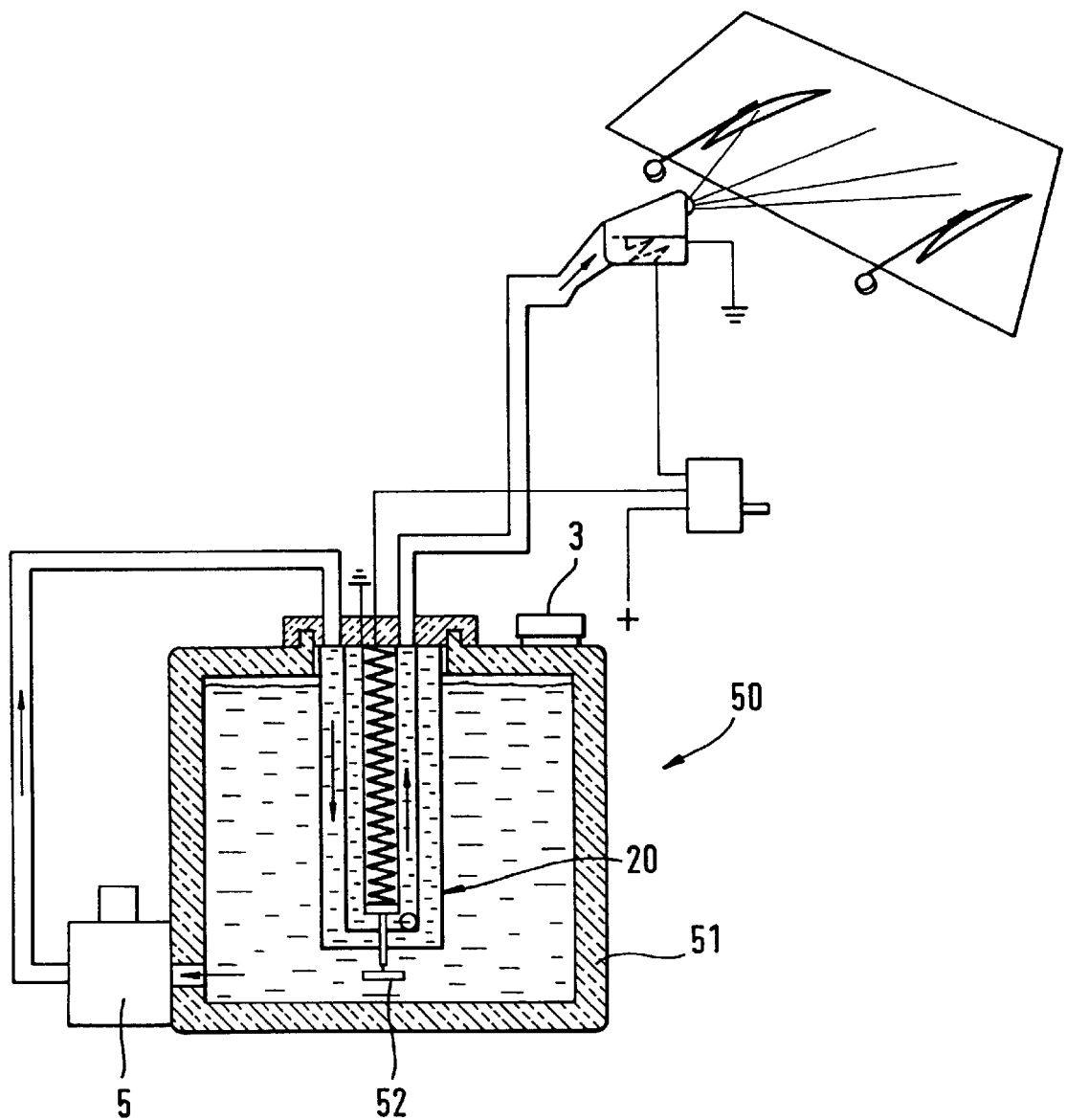
FIG. 4 shows the structural unit installed in a reserve tank for the washing fluid.

FIG. 4 shows a further embodiment, in which an entire structural unit 20 is arranged within a washing water reserve tank 50. In this case, the entire washing water reserve tank 50 is preferably surrounded by good insulation 51. A float 52 makes it possible to ensure that the heating can no longer be switched on when the washing water falls below a specific level. The pump 5 is mounted on the washing water reserve tank at the bottom, as indicated merely diagrammatically. Said pump may also be combined with the structural unit 20 or assembled together with the latter, with the washing water supply being led correspondingly out of the lower region of the washing water reserve tank 50.

For the retrofitting of existing systems, the waste heat from the internal combustion engine may also be utilized instead of electric heating. In this case, during travel, about the same degree of comfort is obtained. However, during cold starting, it is necessary to wait for some time until a small quantity of washing water is heated. Where new vehicles are concerned, electric heating is preferred.

What is claimed is:

1. A thermal windshield washer system for heating washing liquid for a windshield wiper system of a vehicle having a spray nozzle for spraying the washing liquid on a windshield of the vehicle, the windshield washer system comprising:

an instant heating element having controllable electric heating and a chamber enclosing the heating element, a wall of the chamber being spaced apart from the heating element to provide a passage for the washing liquid;

a reserve tank having the washing liquid;

a pump conveying the washing liquid to the instant heating element; and wherein the instant heating element has an outlet arranged adjacent to said spray nozzle, the washing liquid being supplied as a small quantity of washing liquid to the instant heating element, and the instant heating element being enabled so as to heat said small quantity of washing liquid to a temperature at least 30° C. above ambient temperature; and the instant heating element further comprises a temperature sensor located at the passage to enable the heating element to heat the desired quantity of washing liquid to a desired temperature.

2. A thermal windshield washer system for heating washing liquid for a windshield wiper system of a vehicle having a spray nozzle for spraying the washing liquid on a windshield of the vehicle, the windshield washer system comprising:

an instant heating element having controllable electric heating;

a reserve tank having the washing liquid;

a pump conveying the washing liquid to the instant heating element; and wherein the instant heating element has an outlet arranged adjacent to said spray nozzle, the washing liquid being supplied as a small quantity of washing liquid to the instant heating element, and the instant heating element being enabled so as to heat said small quantity of washing liquid to a temperature at least 30° C. above ambient temperature; and the instant heating element has an instant heating chamber formed as a primary chamber within a secondary chamber and the latter is connected to the reserve tank.

3. The thermal windshield washer system as set forth in claim 2, wherein the primary chamber and secondary chamber are arranged as a structural unit outside the reserve tank.

4. The thermal windshield washer system as set forth in claim 2, wherein the primary chamber and secondary chamber are formed as a structural unit separate from the reserve tank, said pump for the washing fluid is arranged between the reserve tank and the structural unit, the structural unit being arranged in proximity to the windshield wiper system.

5. The thermal windshield washer system as set forth in claim 2, wherein the instant heating chamber is thermally insulated relative to the outside.

6. A thermal windshield washer system for heating washing liquid for a windshield wiper system of a vehicle having a spray nozzle for spraying the washing liquid on a windshield of the vehicle, the windshield washer system comprising:

an instant heating element having controllable electric heating;

a reserve tank having the washing liquid;

a pump conveying the washing liquid to the instant heating element; and wherein the instant heating element has an outlet arranged adjacent to said spray nozzle, the washing liquid being supplied as a small quantity of washing liquid to the instant heating element, and the instant heating element being enabled so as to heat said small quantity of washing liquid to a temperature at least 30° C. above ambient temperature; and said instant heating element has an instant heating duct, said duct is arranged as a primary chamber within a secondary casing, for providing heat exchange from the instant heating duct into the secondary casing, the secondary casing being thermally insulated relative to the outside.

7. The thermal windshield washer system as set forth in claim 1, wherein the electric heating is controlled such that switch-on and/or duration of the switch-on and/or the temperature to be reached of the small quantity of washing liquid is selectable.

8. The thermal windshield washer system as set forth in claim 7, wherein the electric heating is switched on and off via an ignition lock of the vehicle and/or via a switch.

9. The thermal windshield washer system as set forth in claim 8, wherein in control of the electric heating, the temperature sensor serves as setting means for the temperature of the washing liquid.

10. The thermal windshield washer system as set forth in claim 3, wherein the structural unit together with the instant heating chamber is thermally insulated relative to the outside.

* * * * *